United States Patent [19]

Kuntz

[11] Patent Number: 4,942,210

[45] Date of Patent: Jul. 17, 1990

[54] BRANCHED ISOOLEFIN POLYMER PREPARED WITH ADAMANTANE CATALYST SYSTEM

[75] Inventor: Irving Kuntz, Linden, N.J.

[73] Assignee: Exxon Chemical Patents Inc., Linden, N.J.

[21] Appl. No.: 88,251

[22] Filed: Aug. 24, 1987

Related U.S. Application Data

[62] Division of Ser. No. 826,244, Feb. 5, 1986, Pat. No. 4,711,866.

[51] Int. Cl.$^5$ .................... C08F 4/14; C08F 10/10; C08F 36/08
[52] U.S. Cl. ................... 526/348.7; 526/183; 526/185; 526/221; 526/237; 526/335; 526/339; 525/332.8; 525/333.7; 525/334.1; 525/379; 525/381; 525/384; 525/386; 525/918
[58] Field of Search ............... 526/185, 221, 237, 335, 526/339, 183, 348.7; 525/359.5, 332.8, 333.7, 334.1, 379, 381, 384, 386

[56] References Cited

U.S. PATENT DOCUMENTS 4,602,077 7/1986 Cecchin et al. .................... 526/339

FOREIGN PATENT DOCUMENTS 0137574 4/1985 European Pat. Off. ............ 526/237

OTHER PUBLICATIONS

Diem et al., "Isobutylene Polymerization in the Presence of UV Light, Organic Iodides and Zinc Iodide", Polym. Bull. 1, 281-86 (1979).

Primary Examiner—Joseph L. Schofer
Assistant Examiner—F. M. Teskin

[57] ABSTRACT

Isobutylene homopolymers and copolymers are prepared using a catalyst system comprising a haloadamantane component and a Lewis acid. Branched polymers are prepared using polyhaloadamantanes, the branches being attached to the adamantane at the former location of the halide. The preferred catalyst systems are diethylaluminum chloride and bromoadamantane as well as polybromo, or polychloroadamantanes.

7 Claims, No Drawings

BRANCHED ISOOLEFIN POLYMER PREPARED WITH ADAMANTANE CATALYST SYSTEM

This is a division, of application Ser. No. 826,244, filed 2/5/86, now U.S. Pat. No. 4,711,866.

FIELD OF INVENTION

This invention relates to a polymerization catalyst for the preparation of homopolymers and copolymers of isobutylene. The catalyst comprises a Lewis acid activated by a bromo- and/or chloro-adamantane. Polymers of novel composition and capable of facile chemical modification can be prepared by the process of this invention.

BACKGROUND OF THE INVENTION

It is known in the art that the polymerization of isobutylene and isobutylene copolymers can be initiated with combinations of dialkylaluminum halides and active organic halides, e.g. see J. P. Kennedy, pages 302 ff, and in particular pages 306 and 307 of *Polymer Chemistry of Synthetic Elastomers*, edited by J. P. Kennedy and E. G. M. Tornqvist, Part I, Interscience New York, 1968. Kennedy shows that the most reactive organic halide is tertiary-butyl chloride (TBC). In terms of a parameter called "cocatalyst efficiency, g/mole" he shows TBC with a value of 1,030,000 compared, for example, with a value of 369 for secondary-butyl chloride. Kennedy shows that allylic halides and benzylic halides are relatively active with cocatlyst efficiencies in the range of about 7,000 to 140,000.

Diem et al attempted to utilize adamantyl iodide in the presence of UV light to induce the polymerization of isobutylene. No polymer was produced upon irradiation of isobutylene, adamantyl iodide (AI) or TBC. The addition of zinc dust gave low yields of polyisobutylene having a low molecular weight. Diethyl zinc had no influence. See Diem, T., Kennedy, J. P. et al, "Isobutylene Polymerization in The Presence of UV Light, Organic Iodides and Zinc Iodide," *Polymer Bulletin* 1, 281–285 (1979). Diem also reacted adamantyl iodide with diethylaluminum iodide (mol ratio AlEt$_2$I/AD-I, 5/1) in the dark with isobutylene and obtained 0.73% conversion to polymer at −70° C. (*ibid* p. 284, Table II).

Relative solvolysis rates in 80% ethanol at 25° C. are reported by Carey, F. A. and R. J. Sundberg, *Advanced Organic Chemistry*, Second Ediion, Part A, Plenum Press, New York, 1984, page 261. The relative solvolysis rates for tertiary-butyl bromide and 1- bromoadamantane are 1 and 0.001 respectively. The research of Kennedy (loc cit) suggests that halide reactivity is a measure of catalyst reactivity. On this basis, it would not be anticipated that haloadmantanes would be useful in preparing active catalyst systems.

SUMMARY OF THE INVENTION

It has suprisingly been found that a bromo or chloro adamantane can be used with a Lewis acid component to form an active catalyst system useful in the preparation of isobutylene homopolymers and copolymers. The preferred monohalo adamantanes are 1-bromo or chloro adamantanes. Polyhalo-adamantane, when used in the practice of this invention, result in the formation of branched polymers.

DETAILED DESCRIPTION OF THE INVENTION

This invention relates to a catalyst system for the polymerization of isobutylene and isobutylene copolymers. In particular, it relates to a catalyst system comprising a Lewis acid and a haloadamantane.

In the practice of this invention a wide range of Lewis acids may be used as catalyst. Illustrative non-limiting examples of such Lewis acids are alkyl aluminum dihalides, dialkyl aluminum halide, trialkyl aluminum, aluminum sesquihalide, boron trihalide and tin tetrahalide. The aryl homologs of these Lewis acids may also be utilized. Illustrative, non-limiting examples of particularly useful Lewis acids are aluminum ethyl dichloride, aluminum diethyl chloride, aluminum trichloride, boron trichloride, tin tetrachloride and aluminum phenyl dichloride.

While the bromo and chloro adamantanes are generally useful, the 1- haloadamantanes are preferred where a linear polymer or copolymer is desired. The preferred catalyst system for the preparation of linear polymer is diethyl aluminum chloride activated with 1-bromoadamantane. As used in the specification and claims the term "halo" as used with respect to this invention means bromo or chloro.

The polyhalo-adamantanes are equally useful in the practice of this invention. The dihalo compounds result in two linear polymer chains growing from the same adamantyl moiety, polymerization being initiated at the halo site. Where the polyhalo-adamantane contains three or more halo moieties the product is a branched or star polymer with the polymerization of a linear polymer or copolymer being initiated at each halo moiety site to yield a polymer chain attached to the adamantyl moiety at the position previously occupied by the halo group. This mechanism has been confirmed by gas chromatography and mass spectroscopy analysis. Fragments have been detected which correspond to adamantyl moieties having bounded thereto monomer units at sites formerly ocupied by halogen. The branched or star isobutylene polymers or copolymers of this invention exhibit substantially reduced cold flow and have better processibility as compared to conventional linear PIB and butyl rubber.

The oligomers and polymers formed using the process of this invention can have a molecular weight ($M_n$) of about 150 to about 5,000,000; preferably about 250 to about 1,000,000 more preferably about 500 to about 500,000, e.g. 300,000.

The mole ratio of Lewis acid to halo-adamantane can vary from about 500/1 to about 0.05/1, preferably about 300/1 to about 0.10/1, more preferably about 200/1 to about 0.15/1, most preferably about 150/1 to about 0.25/1. In some embodiments of the invention the ratio of Lewis acid to halo-adamantane can be essentially unity. Where the halo-adamantane is a poly-halo-adamantane, the ratio refers to the ratio Lewis acid/gram atom of halogen.

In carrying out the polymerization process of this invention the mole ratio of olefin to Lewis acid can vary from about 10/1 to about 3000/1 more preferably about 100/1 to about 2000/1, most preferably about 50/1 to about 600/1. As the ratio of olefin to Lewis acid increases molecular weight increases.

The mole ratio of olefin to halo-adamantane affects the molecular weight of the polymer produced. As the ratio increases, the molecular weight increases. The ratio of olefin to halo-adamantane can be about 50/1 to about 5000/1; preferably about 100/1 to about 4000/1; more preferably about 200/1 to about 2500/1; most preferably about 300/1 to about 3000/1.

While product molecular weight can be controlled by adjusting the ratio of reactants and catalyst components, other polymerization conditions can be adjusted to affect product properties. For example, by operating at higher temperatures, lower molcular weight products can be otained by the process of the invention. These lower molecular weight products, e.g. PIB are useful as viscosity index (V.I.) improvers for lubricating oils as well as starting materials for the synthesis of multipurpose oil additives which combine V.I. improvement and sludge dispersancy.

The halo-adamantane and Lewis acid may be premixed before addition to the reaction zone, or each component can be added separately. The Lewis acid and halo-adamantane can be added as solutions in organic solvents, e.g., hexane or methyl chloride. The polymerization can be carried out in any suitable reactor, and is advangeously preformed in a conventional well stirred reactor of the type used for butyl rubber polymerization. It will be appreciated by those skilled in the art that while reference is made to speciic halo-adamananes, in practice, the haloadamantane can be a mixture of various isomers. Where desired the halo-adamantane can be fractioned to reserve specific isomers for use in the practice of this invention.

The advantages of the instant invention may be more readily appreciated by reference to the following examples.

EXAMPLE 1

Preparation of Butyl Rubber With 1-Bromoadamantane-Diethyl Aluminum Chloride

In a glove box under nitrogen, a solution of 25 ml (17.5 g) of a monomer mixture of isobutylene with 2.8 mol % isoprene and 150 ml of methyl chloride was prepared at −94° C. in a 500 ml flask filled with a strirrer, a jacketed dropping funnel and a thermometer. Fifteen ml of a 1.5M solution in hexane of diethyl aluminum chloride (DEAC) was then added to the reaction mixture. To this stirred reaction mixture there were then added 10 ml of a 0.020M solution of 1-bromodamantane (1- BRA) in methyl chloride from a chilled dropping funnel over a 10 minute period. Polymer was precipitated and the temperature of the reaction mixture rose from −94° C. to −33° C. After 10.5 minutes the reaction was quenched by the addition of chilled methanol. After allowing the unreacted reagents to evaporate, excess isopropyl alcohol was added. The white elastomeric product was kneaded with the alcohol and subsequently dried in a vacuum oven. The yield of dried butyl rubber was 12.39 g, which corresponds to 74% conversion. The data on molar ratio of reagents are tabulated in Table I.

EXAMPLE 2

Preparation of Butyl Rubber With Mixed Chloroadamantanes - Diethyl Aluminum Chloride Catalyst System An experiment similar to Example I was repeated using chloroadamantane (CLA) instead of 1- BRA. The CLA was prepared accordingly to the procedure of K. Gerzar et al, *J. Med Chem*, 6, 760, 1963. GC and Mass Spec analysis indicated that the product comprised 93% 1-chloroadamantane 5% of 1, 3- and about 2% of 2- chloroadamantane. The results are shown in Table I. It is apparent that CLA is an effective catalyst component in the catalyst.

EXAMPLE 3

Preparation of Butyl Rubber with 2- BRA-DEAC

An experiment similar to Example I was repeated using 2- bromoadamantane (2- BRA). While polymerization was initiated, it is apparent from the data in Table I that the 1-haloadamantanes give more active catalyst systems than the 2-halo compounds.

EXAMPLE 4 AND 5

Isobutylene was polymerized in a methyl chloride solution using methyl aluminum dichloride (MADC) activated by 1- BRA. The molar ratios and reaction conditions are shown in Table II. It is apparent that MADC is a suitable activator for haloadamantanes. In these experiments mixtures of isobutylene (ISB) and 1-BRA were dissolved in methyl chloride and polymerization was initiated by the addition of MADC in methyl chloride.

The results show that the molecular weight of polyisobutylene (PIB) product can be controlled by adjusting the 1- BRA/ISB ratio.

EXAMPLES 6–11

PIB product was prepared in a continuous stirred reactor using 15% CP isobutylene feeds in hexane at −25° C. The results for 1-BRA/BF$_3$ catalyst system are shown in Table III.

The results of the preparation of PIB using the DEAC/BRA system are shown in Table IV. The DEAC was added to the monomer feed, and therefore, the isobutylene/BRA ratio was fixed. Molecular weight varied with DEAC and feed rates.

The adamantane initiators of this invention permit the preparation of novel macromolecular compositions. For example, by using polyhaloadamantanes branched or star-shaped polyisobutylenes or butyl rubber may be prepared. The process is schematically represented as follows: The polyhalo-adamantane derivative is indicated by the notation shown below:

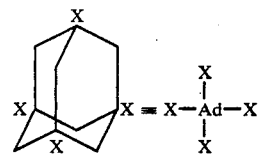

where the adamantane is a trihalo-adamantane a three branched star PIB or butyl rubber can be formed and is illustrated as follows:

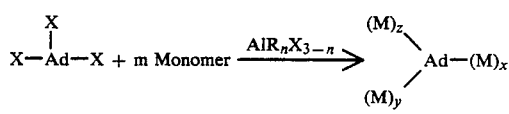

where M represents monomer units and $x+y+z=m$. The tetra halide will yield the corresponding 4 armed star shaped polymer. Such structures enable the synthesis of novel macromolecules. Where the macromolecule is a terminal halo functional PIB, reaction with an ethylene polyamine, e.g. diethylene triamine, results in the formation of a lubricating oil dispersant. In other applications the poly-terminal functional material can be reacted using chemical conversions known in the art to form hydroxy functional materials which can be further reacted using urethane chemistry to form cross linked systems. Examples 12 and 13 illustrate this aspect of the invention utilizing trichloroadamantane as the halo admantane component.

EXAMPLE 12-13

Polymerizations were carried out in a continuous flow stirred tank reactor using an adamantane polychloride (TCA) which NMR analysis showed to be 80% 1, 3, 5-trichloroadamantane and 20% 1, 3, 6-trichloroadamantane. The polymerization was conducted in methyl chloride at −92° C. Monomer feed concentration was 14.5 wt % isobutylene with 2.0 mol % isoprene. The residence time in the reactor was 20 minutes. The results are in Table V.

Not wishing to be bound by theory, it is believed that at high levels of halo adamantane, where the monomer/halide ratio is low, the chain transfer step which occurs is:

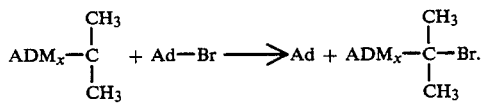

This result can be applied to form PIB or butyl rubber derivatives which are terminally functional. Thus a dihalo derivative of adamantane can yield a terminally functional derivative as follows:

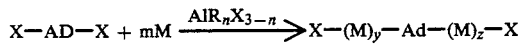

wherein M is monomer, X is halogen and $y+z=m$. Where terminally functional polymers are desired it is preferred that lower monomer to halo-adamantane mole ratios be used, e.g. less than 200, for example about 0.5 to about 50, in conjunction with low temperatures, e.g. less than about 0° C., more preferable below about −10° C., most preferable below about −20° C.

The novel products of this invention can be represented by the general formula:

wherein AD represents an adamantyl nucleus, M is an isoolefin polymer moiety and n is an integer from 1 to 4. The isoolefin polymer moiety (M) can have a molecular weight ($M_n$) of about 50 to 1,250,000. Where n is greater than 1, M is preferably about 100 to about 500,000, more preferably about 150, to about 300,000, e.g. 100,000. Where the isoolefin polymer moiety has a terminal functional group it will ordinarily be a halo moiety. However, the halogen can readily be converted to other types of functional groups such as hydroxy, carboxylic acid or amine by methods known to those skilled in the art. Alternately, the terminal functional polymer can be dehydrohalogenated so that the isoolefin polymer terminates in an olefin moiety.

As used in the specification and claims, the term isoolefin polymer means homopolymers and copolymers of isoolefins. The term copolymer as used in the specification and claims encompasses both copolymers of isoolefins and copolymers of isoolefins with a conjugated diene monomer.

The expression "butyl rubber" is used in the rubber industry to describe copolymers made from a polymerization reaction mixture having therein from 70 to 99.5% by weight of an isoolefin which has about 30 to 0.5% by weight of a conjugated multiolefin having from 4 to 14 carbon atoms, e.g. isoprene. The resulting copolymers contain 85 to 99.8% by weight combined isoolefin and about 0.2 to about 15% combined multiolefin.

The preparation of butyl rubber is described in U.S. Pat. No. 2,356,128, which is incorporated herein by reference. The polymer backbone of commercial butyl rubber is made up primarily of isobutylene units, with just a few percent isoprene units. The isoprene units contribute the small amount of unsaturation present in butyl rubber. As used in the specification and claims the term "butyl rubber" means the aforedescribed isoolefin—conjugated multiolefin polymers.

The polymerization process of this invention can be carried out at the temperatures and pressures customarily used in the polymerization of isoolefins. Preferably, the polymerization is carried out at subzero temperatures, e.g. −20° C. to about −100° C. While higher temperatures may be used, the product formed at higher temperatures will generally be low molecular weight polymers or oligomers.

TABLE I

| Example No. | 1 | 2 | 3 |
|---|---|---|---|
| Adamantyl Halide | 1-Bromo | Chloro[a] | 2-Bromo |
| Mole Ratio Monomer/DEAC | 14 | 14 | 14 |
| Monomer/Halide | 1560 | 1080 | 1360 |
| DEAC/Halide | 110 | 77 | 96 |
| Initial Temp, °C. | −94 | −92 | −90 |
| Maximum Temp, °C. | −33 | −84 | −88 |
| Polymer Yield, Grams | 12.39 | 11.24 | 0.83 |
| Conversion, % | 74 | 64 | 5 |
| Viscosity Average $M_w \times 10^{-3}$ | 195 | 67 | 62 |
| Mole % Unsaturation | 1.5 | 1.5 | 1.2 |

[a] Mixed chloro adamantane —93% 1-chloro, 5% 1, 3- chloro and 2% 2- chloro.

TABLE II

| Example No. | 4 | 5 |
|---|---|---|
| Mol Ratio ISB/MADC | 2500 | 2500 |
| ISB/BRA | 833 | 435 |
| Yield Polymer, Wt % | 8 | 16 |
| $M_v \times 10^{-3}$ | 218 | 81 |
| Total Reaction Volume, ml | 190 | 150 |
| Reaction Temp, °C. | −75/−73 | −71/−69 |

TABLE III

| POLYMERIZATION WITH BF$_3$/BRA CATALYSTS | |
|---|---|
| Example No. | 6[a] |
| ISB/BF$_3$ | 209 |
| ISB/BRA | 500 |
| BF$_3$/BRA | 2.5 |
| Conv % | 48 |
| t °C. | −27 |
| $M_n$[b] | 7698 |
| $M_w$[b] | 13752 |
| $M_z$[b] | 18918 |
| $M_w/M_n$[b] | 1.8 |

[a] 14.5% Isobutylene in feed. Initial conversion, in absence of BRA was 37%.
[b] From GPC

TABLE IV

| ISOBUTYLENE POLYMERIZATIONS WITH DEAC/BRA[a] | | | |
|---|---|---|---|
| Example | ISB/DEA | ISB/BRA | EAC/BRA |

TABLE IV-continued

ISOBUTYLENE POLYMERIZATIONS WITH DEAC/BRA[a]

| No. | Feed Molar Ratio | | Θ[e] Min | |
|---|---|---|---|---|
| 7[b] | 105 | 255 | 2.4 | 18 |
| 8[b] | 313 | 255 | 0.82 | 20 |
| 9[c] | 590 | 255 | 0.43 | 11 |
| 10[d] | 147 | 255 | 1.7 | 40 |
| 11[c] | 199 | 255 | 1.3 | 10 |

| Example # | Conv. Wt. % | t °C. | $M_n$ | $M_w$ | $M_z$[f] | $M_w/M_n$ |
|---|---|---|---|---|---|---|
| | | | From GPC | | | |
| 7[b] | 99 | −22 | 819 | 1751 | 6265 | 2.1 |
| | | | 778 | 1539 | 4148 | 2.0 |
| 8[b] | 100 | −15 | 865 | 1914 | 6060 | 2.2 |
| | | | 814 | 1827 | 5885 | 2.2 |
| 9[c] | 100 | −25 | 557 | 1083 | 2800 | 1.9 |
| | | | 569 | 1095 | 2593 | 1.9 |
| 10[d] | 100 | −27 | 929 | 3258 | 10194 | 3.5 |
| | | | 994 | 3237 | 10079 | 3.2 |
| 11[c] | 100 | −21 | 559 | 2455 | 8821 | 4.4 |
| | | | 589 | 2440 | 9002 | 4.3 |

FOOTNOTES:
[a]17% Isobutylene in feed; DEAC was 2.2% in hexane and flow rates were 12 or 4 mL/m.
[b]Feed flow rate 84 mL/m.
[c]Feed rate 160 mL/m.
[d]Feed rate 40 mL/m.
[e]Residence time.
[f]Replicate determinations.

TABLE V

| Example | 12 | 13 |
|---|---|---|
| Monomer/DEAC | 137 | 26 |
| Monomer/TCA | 6000 | 6450 |
| DEAC/TCA | 160 | 246 |
| Conversion, % | 23 | 25 |
| $M_v \times 10^{-3}$ | 240 | 360 |
| Mooney Viscosity (1 + 8, 100° C.) | 25 | 46 |
| Mole % Unsaturation | 1.1 | 0.98 |

What is claimed is:

1. An isoolefin polymer having the structural formula:

$$AD{-}M)_n$$

wherein AD represents an adamantyl nucleus, M is an isoolefin polymer moiety and n is an integer from 2 to 4, wherein said polymer is prepared using a catalyst system comprising a bromo- or chloro- adamantane and a Lewis acid.

2. The isoolefin polymer according to claim 1 wherein M is an isoolefin polymer moiety having a terminal functional group.

3. The isoolefin polymer according to claim 2 wherein the functional group is chloro- or bromo-.

4. The isoolefin polymer according to claim 2 wherein the functional group is carboxylic acid, hydroxyl or an amine moiety.

5. The isoolefin polymer according to claim 1 wherein M has a number average molecular weight of about 50 to about 1,250,000.

6. The isoolefin polymer according to claim 1 wherein M has a number average molecular weight of about 100 to about 500,000.

7. The isoolefin polymer according to claim 1 wherein M has a number average molecular weight of about 150 to about 300,000.

* * * * *